US012614970B2

(12) United States Patent
Ishikawa

(10) Patent No.: US 12,614,970 B2
(45) Date of Patent: Apr. 28, 2026

(54) NOISE SUPPRESSION DEVICE

(71) Applicant: Mitsubishi Electric Corporation, Tokyo (JP)

(72) Inventor: Junichiro Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 341 days.

(21) Appl. No.: 18/265,969

(22) PCT Filed: Jan. 5, 2021

(86) PCT No.: PCT/JP2021/000125
§ 371 (c)(1),
(2) Date: Jun. 8, 2023

(87) PCT Pub. No.: WO2022/149192
PCT Pub. Date: Jul. 14, 2022

(65) Prior Publication Data
US 2024/0097557 A1 Mar. 21, 2024

(51) Int. Cl.
*H02M 1/12* (2006.01)
*H02M 1/00* (2006.01)
(Continued)

(52) U.S. Cl.
CPC ......... *H02M 1/123* (2021.05); *H02M 1/0038* (2021.05); *H02M 1/32* (2013.01); *H02M 1/40* (2013.01)

(58) Field of Classification Search
CPC ...... H02M 1/123; H02M 1/0038; H02M 1/32; H02M 1/40
See application file for complete search history.

(56) References Cited

U.S. PATENT DOCUMENTS 6,271,651 B1 * 8/2001 Stratakos .............. H02M 3/158
323/282
8,786,371 B2 * 7/2014 Popplewell ........... H02M 3/158
330/297
(Continued)

FOREIGN PATENT DOCUMENTS

JP H09-266677 A 10/1997
JP 2007-329930 A 12/2007
JP 2013-158085 A 8/2013

OTHER PUBLICATIONS

International Search Report mailed on Mar. 2, 2021, received for PCT Application PCT/JP2021/000125, filed on Jan. 5, 2021, 5 pages including English Translation.
(Continued)

*Primary Examiner* — Adolf D Berhane
(74) *Attorney, Agent, or Firm* — XSENSUS LLP

(57) ABSTRACT

Provided is a noise suppression device capable of suppressing a common mode current with higher certainty. The noise suppression device includes a common mode coil connected between a power supply and a control device; and an electronic device which is connected in parallel with the common mode coil and in which a low frequency current of a current flowing between the power supply and the control device flows. In the noise suppression device, the low frequency current of the current flowing between the power supply and the control device flows in the electronic device. It is therefore possible to suppress the common mode current with higher certainty.

11 Claims, 7 Drawing Sheets

(51) Int. Cl.
H02M 1/32 (2007.01)
H02M 1/40 (2007.01)

(56) References Cited

U.S. PATENT DOCUMENTS

| | | | |
|---|---|---|---|
| 10,177,702 B2 * | 1/2019 | Shimura | ................. H02M 1/44 |
| 10,454,370 B2 * | 10/2019 | Babazadeh | ............. H02M 1/32 |
| 12,040,709 B2 * | 7/2024 | Sato | ...................... H02M 3/156 |
| 2007/0296374 A1 | 12/2007 | Baudesson et al. | |
| 2019/0131876 A1 * | 5/2019 | Luff | ........................ H02M 1/08 |
| 2025/0070646 A1 * | 2/2025 | Wakisaka | ............. H02M 7/487 |

OTHER PUBLICATIONS

Henglin Chen et al., Elimination of Common-Mode Choke Saturation Caused by Self-Resonance of the EMI Filter in a Variable-Frequency Drive System, IEEE Trans. on Electromagnetic Compatibility, vol. 61, No. 4 (Aug. 2019), 8pp.
Office Action dated Apr. 23, 2025 in the corresponding Korean patent application No. 10-2023-7021649, 9pp.
Office Action dated Dec. 26, 2025 in the corresponding Korean patent application No. 10-2023-7021649, 8pp.

* cited by examiner

NOISE SUPPRESSION DEVICE

CROSS-REFERENCE TO RELATED APPLICATION

The present application is based on PCT filing PCT/JP2021/000125, filed Jan. 5, 2021, the entire contents of which are incorporated herein by reference.

FIELD

The present disclosure relates to a noise suppression device.

BACKGROUND

PTL 1 discloses a noise suppression device. By using the noise suppression device, it is possible to suppress a common mode current.

CITATION LIST

Patent Literature

[PTL 1] JP 2013-158085 A

SUMMARY

Technical Problem

However, the noise suppression device disclosed in document 1 applies voltage to a wire so as to cancel out the voltage applied to common mode coils. For this reason, in some situations such as when there is high impedance on the power supply side of the common mode coils, it may not be possible to suppress the common mode current.

The present disclosure provides a solution for the above-mentioned problem. It is an object of the present disclosure to provide a noise suppression device capable of suppressing the common mode current with higher reliability.

Solution to Problem

A noise suppression device according to the present disclosure includes: a common mode coil connected between a power supply and a control device; and an electronic device which is connected in parallel with the common mode coil and in which a low frequency current of a current flowing between the power supply and the control device flows.

Advantageous Effects of Invention

According to the present disclosure, the low frequency current of the current flowing between the power supply and the control device flows in the electronic device, but does not flow in the common mode coils. It is therefore possible to prevent magnetic saturation in the common mode coils. Consequently, it is possible to suppress a high frequency common mode current with higher reliability.

DESCRIPTION OF EMBODIMENTS

Figure 1:
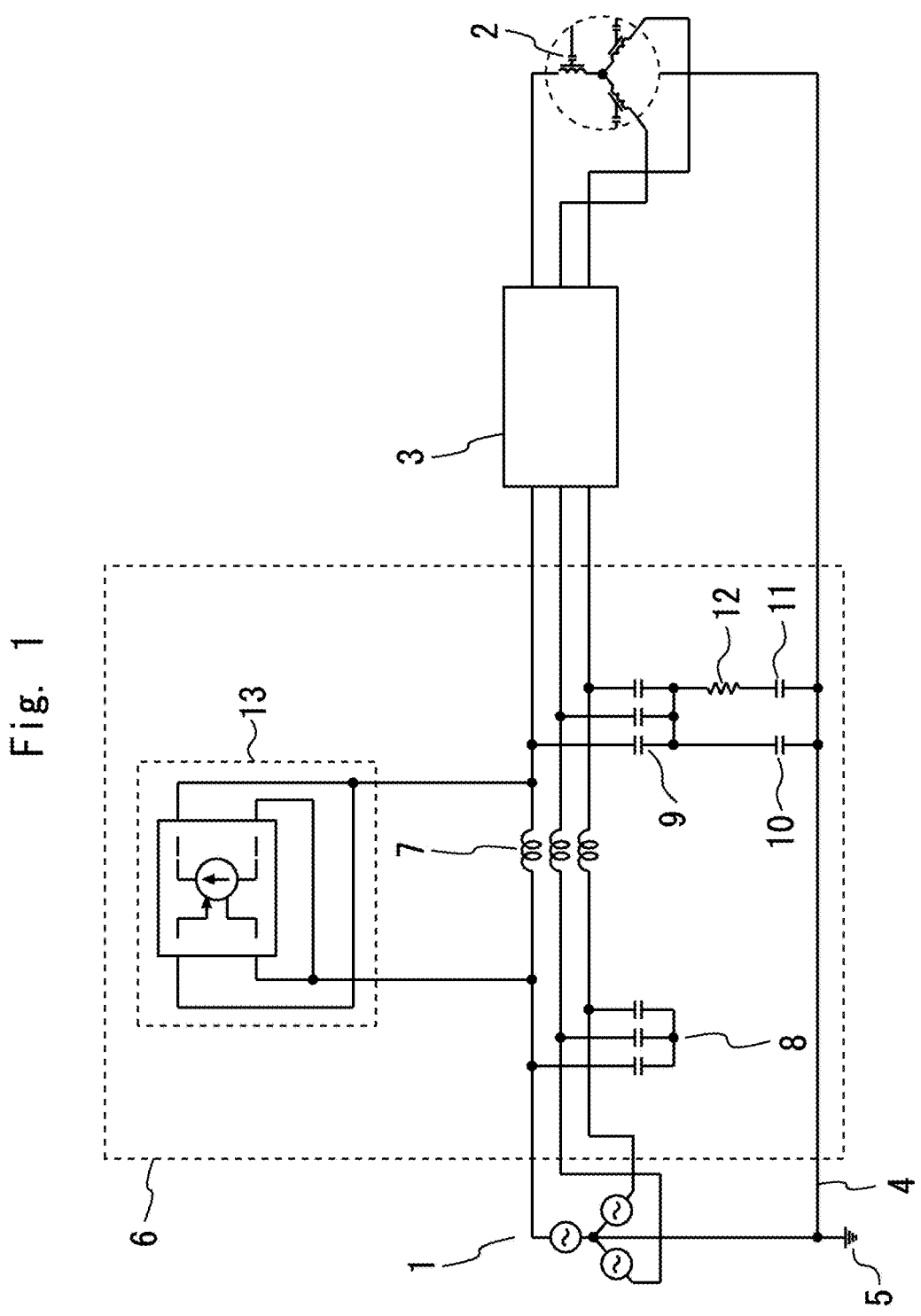
FIG. 1 is a configuration diagram of a relevant part of a driving mechanism for an elevator system to which a noise suppression device according to a first embodiment is applied.

Embodiments will be explained with reference to the accompanying drawings. In the drawings, the same or corresponding elements are referred to by using the same reference characters. Duplicate explanations of those elements will be simplified or omitted as appropriate.

First Embodiment

FIG. 1 is a configuration diagram of a relevant part of a driving mechanism for an elevator system to which a noise suppression device according to a first embodiment is applied.

In FIG. 1, a power supply 1 is provided so as to be able to supply electric power. For example, the power supply 1 may be a commercial power supply. A motor 2 structures a main part of an elevator traction machine. A control device 3 is provided so as to be able to control the elevator traction machine. For example, the control device 3 is provided so as to be able to supply the electric power from the power supply 1 to the motor 2 by using an inverter (not shown). A ground wire 4 is connected, as a reference potential member, to the power supply 1 and to the motor 2. A ground 5 is connected to the ground wire 4.

A noise suppression device 6 is provided between the power supply 1 and the control device 3. The noise suppression device 6 includes a plurality of common mode coils 7 wound around mutually the same core (not shown); a plurality of input-side interphase capacitors 8; a plurality of output-side interphase capacitors 9; a first output-side line-to-ground capacitor 10; a second output-side line-to-ground capacitor 11; an output-side resistor 12; and an electronic device 13.

The plurality of common mode coils 7 are connected between the power supply 1 and the control device 3. The plurality of input-side interphase capacitors 8 are connected between the power supply 1 and the common mode coils 7. The plurality of output-side interphase capacitors 9 are connected between the common mode coils 7 and the control device 3. The first output-side line-to-ground capacitor 10 is connected between the plurality of output-side interphase sensors and the ground wire 4. The electronic device 13 is connected in parallel with the common mode coils 7. More specifically, the electronic device 13 is connected to the two ends of winding wires of the common mode coils 7.

Next, an equivalent circuit in a common mode will be explained, with reference to FIG. 2.

Figure 2:
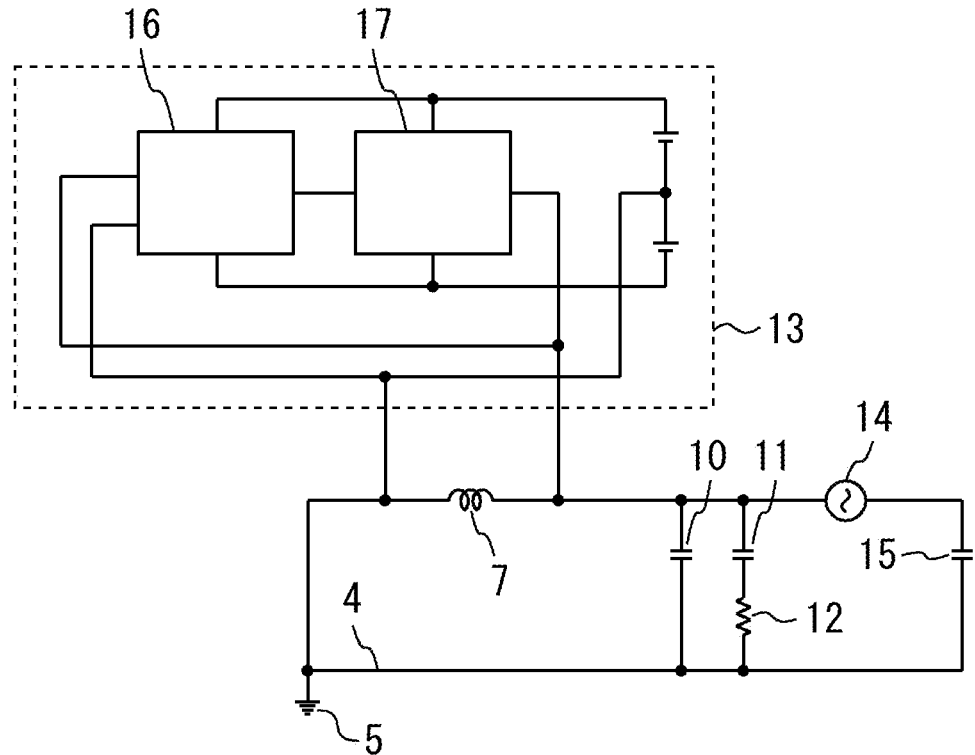
FIG. 2 shows the equivalent circuit in the common mode for a relevant part of the driving mechanism of the elevator system to which the noise suppression device according to the first embodiment is applied.

FIG. 2 shows the equivalent circuit in the common mode for a relevant part of the driving mechanism of the elevator system to which the noise suppression device according to the first embodiment is applied.

In FIG. 2, a common mode voltage source 14 corresponds to common mode voltage generated by the control device 3. A line-to-ground capacitance 15 corresponds to a line-to-ground capacitance between a winding wire of the motor 2 and a casing.

In the equivalent circuit, the common mode voltage is divided between a parallel circuit made up of the common mode coils 7, the first output-side line-to-ground capacitor 10, and the second output-side line-to-ground capacitor 11 and the line-to-ground capacitance 15. Although not shown, a leakage current flowing to the power supply 1 is determined by the voltage divided for the common mode coils 7 and impedance characteristics of the common mode coils 7.

The electronic device 13 includes a calculation device 16 and a power amplifier 17.

The calculation device 16 detects voltage applied to the two ends of the common mode coils 7. On the basis of the voltage, the calculation device 16 calculates the value of the current that needs to be bypassed. The power amplifier 17 amplifies a result of the calculation by the calculation device 16. The power amplifier 17 causes the amplified current to flow. The electronic device 13 suppresses a low frequency magnetic flux occurring inside cores of the common mode coils 7, by operating in such a manner that a low frequency current of the current flowing between the power supply 1 and the control device 3 flows in the electronic device.

On such occasion, a series connection member made up of the second output-side line-to-ground capacitor 11 and the output-side resistor 12 damps resonance with the common mode coils 7 which the first output-side line-to-ground capacitor 10 alone is not able to suppress.

Next, a method for determining the current to be bypassed by the electronic device 13 will be explained, with reference to FIG. 3.

Figure 3:
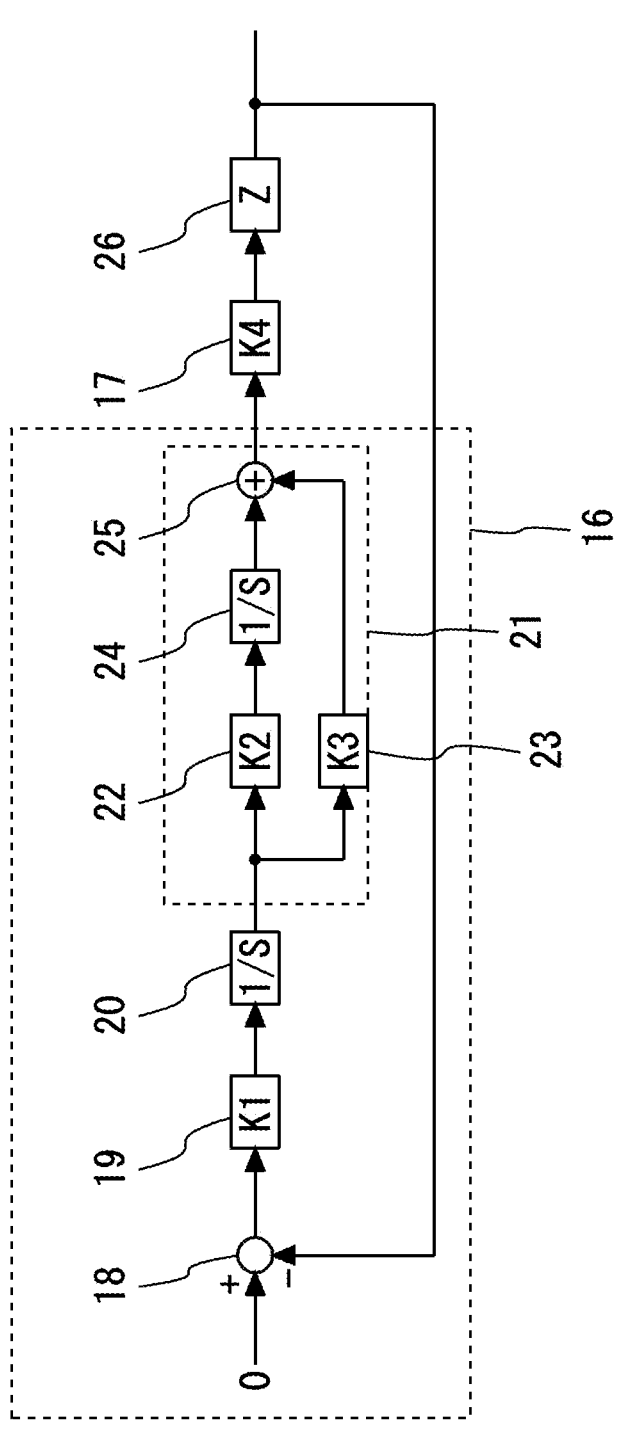
FIG. 3 is a configuration diagram of a relevant part of the electronic device in the noise suppression device according to the first embodiment.

FIG. 3 is a configuration diagram of a relevant part of the electronic device in the noise suppression device according to the first embodiment.

As shown in FIG. 3, the calculation device 16 includes an error detector 18, a first amplitude amplifier/attenuator 19, a first integrator 20, and an error amplifier 21.

The error amplifier 21 includes a second amplitude amplifier/attenuator 22, a second integrator 24, a third amplitude amplifier/attenuator 23, and an adder 25.

The error detector 18 receives an input of information about a command value and the value of the voltage occurring in the common mode coils 7. The error detector 18 calculates the difference between the command value and the value of the voltage occurring in the common mode coils 7. For example, while the command value is set to 0, the error detector 18 calculates the difference between the command value and the value of the voltage occurring in the common mode coils 7. The error detector 18 outputs information about the value of the difference.

The first amplitude amplifier/attenuator 19 receives an input of the information about the output value of the error detector 18. The first amplitude amplifier/attenuator 19 calculates a value obtained by amplifying the output value of the error detector 18. The first amplitude amplifier/attenuator 19 outputs the value obtained by amplifying the output value from the error detector 18.

The first integrator 20 receives an input of the information about the output value of the first amplitude amplifier/attenuator 19. The first integrator 20 calculates the value of a variable corresponding to the current, by integrating the output value of the first amplitude amplifier/attenuator 19. The first amplitude amplifier/attenuator 19 outputs information about the value of the variable corresponding to the current.

The error amplifier 21 receives an input of the information about the output value of the first integrator 20. The error amplifier 21 calculates a value obtained by amplifying the output value of the first integrator 20, by using the second amplitude amplifier/attenuator 22, the second integrator 24, the third amplitude amplifier/attenuator 23, and the adder 25. The error amplifier 21 outputs information about the value obtained by amplifying the output value of the first integrator 20.

The power amplifier 17 receives an input of the information about the output value of the error amplifier 21. The power amplifier 17 causes a current corresponding to the output value of the error amplifier 21 to flow to component parts such as the common mode coils 7, the first output-side line-to-ground capacitor 10, the second output-side line-to-ground capacitor 11, the output-side resistor 12, and the line-to-ground capacitance 15. For the common mode coils 7, the voltage occurring at the two ends thereof is determined by impedance 26 of these component parts.

Next, advantageous effects of the noise suppression device 6 will be explained, with reference to FIG. 4A, FIG. 4B, FIG. 4C, FIG. 4D, and FIG. 4E.

FIG. 4 show charts of current waveforms for explaining the advantageous effects of the noise suppression device according to the first embodiment. In FIGS. 4, the horizontal axis expresses time. The vertical axis expresses a current. All the axes are on the same scale.

Figure 4A:
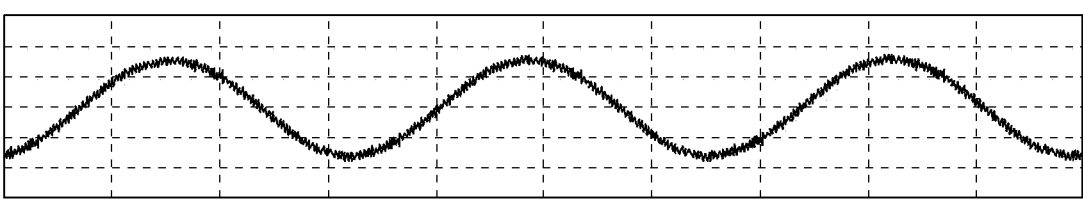
FIG. 4A, FIG. 4B, FIG. 4C, FIG. 4D, and FIG. 4E show charts of current waveforms for explaining the advantageous effects of the noise suppression device according to the first embodiment.
Figure 4B:
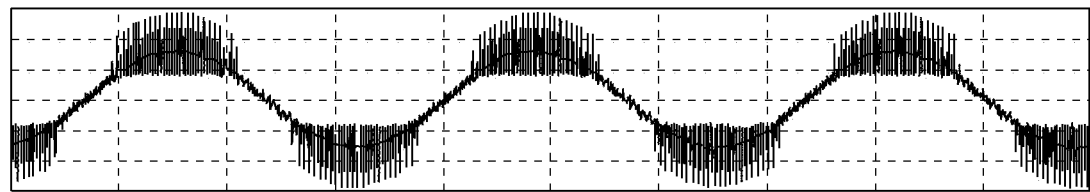
Figure 4C:
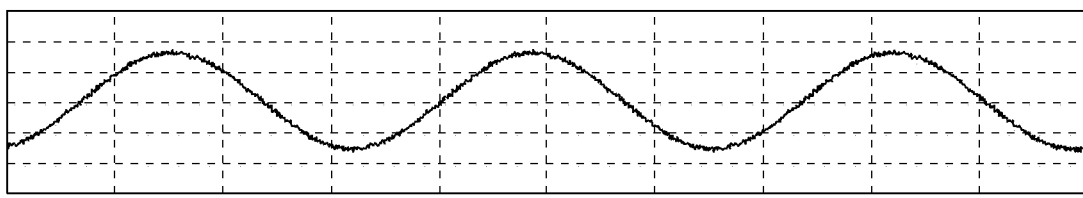
Figure 4D:
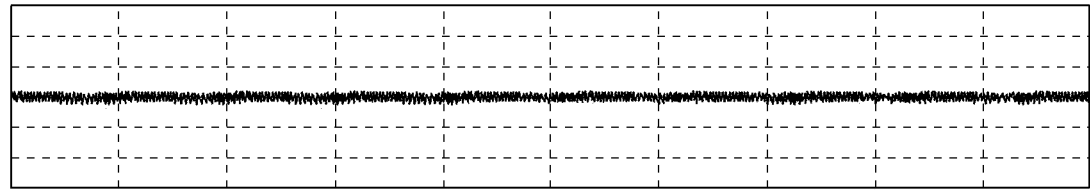
Figure 4E:
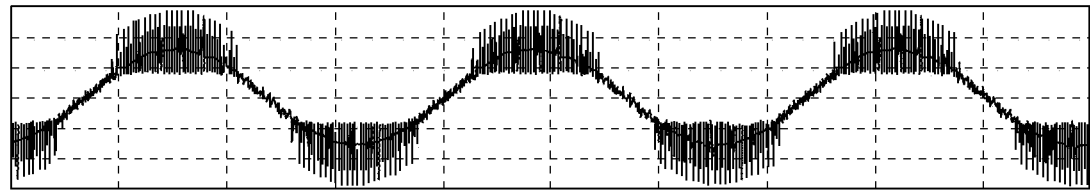

FIG. 4A illustrates a waveform of a leakage current to the power supply 1 in the first embodiment. FIG. 4B illustrates a waveform of a leakage current to the power supply 1 in the situation where the electronic device 13 is not provided. FIG. 4C illustrates a waveform of a current bypassed by the electronic device 13 in the first embodiment. FIG. 4D illustrates a waveform of a common mode current in the common mode coils 7 in the first embodiment. FIG. 4E illustrates a waveform of a common mode current in the common mode coils 7 in the situation where the electronic device 13 is not provided.

In the situation where the electronic device 13 is not provided, magnetism saturates in the common mode coils 7, due to an occurring magnetic flux. While the magnetism is saturated, inductance of the common mode coils 7 is small. For this reason, as illustrated in FIG. 4B and FIG. 4E, a noise current flows to the power supply 1 and to the common mode coils 7, without being suppressed.

In contrast, as illustrated in FIG. 4C, in the first embodiment, the electronic device 13 bypasses a low frequency current of the current flowing between the power supply 1 and the control device 3. In that situation, in the common mode coils 7, the magnetism saturation is suppressed. As a result, as illustrated in FIG. 4A, the high frequency noise current flowing to the power supply 1 is suppressed. As illustrated in FIG. 4D, only the high frequency noise current flows in the common mode coils 7.

Next, advantageous effects achieved by providing the first output-side line-to-ground capacitor 10, the second output-side line-to-ground capacitor 11, and the output-side resistor 12 will be explained, with reference to FIG. 5A and FIG. 5B.

FIG. 5 present charts showing open loop characteristics for explaining the advantageous effects achieved by providing the noise suppression device according to the first embodiment with the first output-side line-to-ground capacitor, the second output-side line-to-ground capacitor, and the output-side resistor.

Figure 5A:
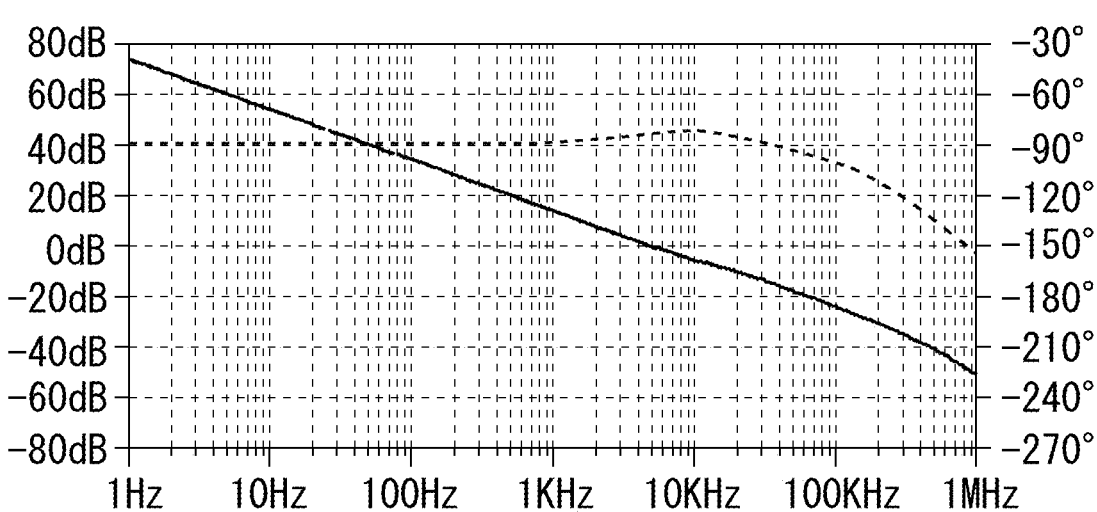
FIG. 5A and FIG. 5B present charts showing open loop characteristics for explaining the advantageous effects achieved by providing the noise suppression device according to the first embodiment with the first output-side line-to-ground capacitor, the second output-side line-to-ground capacitor, and the output-side resistor.

FIG. 5A illustrates open loop characteristics in the situation where the first output-side line-to-ground capacitor 10, the second output-side line-to-ground capacitor 11, and the output-side resistor 12 are provided. FIG. 5B illustrates open loop characteristics in the situation where the second output-side line-to-ground capacitor 11 and the output-side resistor 12 are not provided.

Figure 5B:
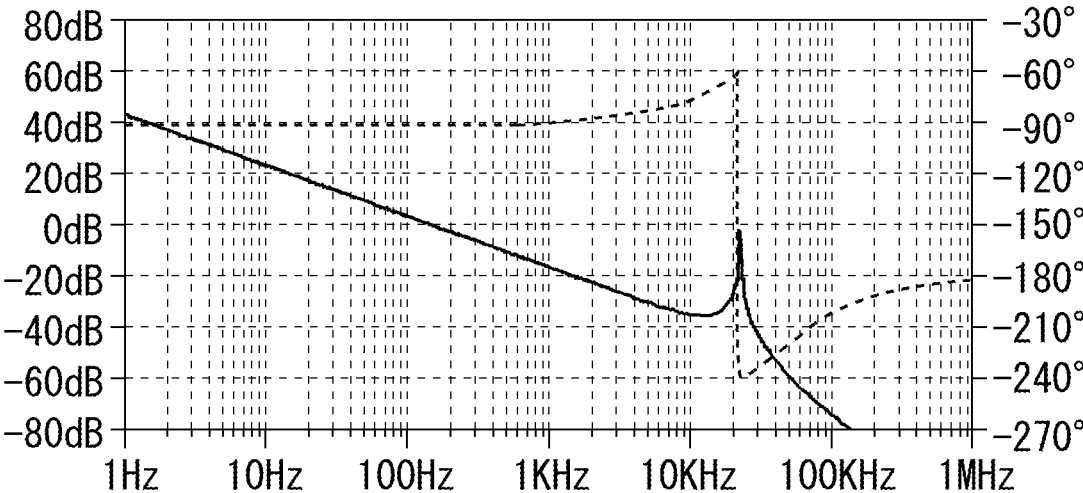

In the situation where the second output-side line-to-ground capacitor 11 and the output-side resistor 12 are not provided, as illustrated in FIG. 5B, a high peak would be observed around 20 kHz, due to resonance between the common mode coils 7 and the first line-to-ground capacitor. When this characteristic is taken into consideration, only small open loop gain is ensured in the vicinity of the frequency of commercial power supplies.

In FIG. 5B, although a PI element is added to a control system, with the break frequency thereof being made equal to the resonance frequency between the common mode coils 7 and the first output-side line-to-ground capacitor 10, it is not possible to sufficiently ameliorate impacts of the resonance.

In the situation where the first output-side line-to-ground capacitor 10, the second output-side line-to-ground capacitor 11, and the output-side resistor 12 are provided, the resonance is suppressed. For this reason, as illustrated in FIG. 5A, it is possible to ensure large open loop gain in the vicinity of the frequency of commercial power supplies.

In FIG. 5A, the open loop gain is set at a moderate level; however, it is also acceptable to further raise a gain crossover frequency.

In contrast, in FIG. 5A, a PI element is added to a control system, with the break frequency thereof being made equal to the resonance frequency among the common mode coils 7, the first output-side line-to-ground capacitor 10, and the second output-side line-to-ground capacitor 11.

According to the first embodiment described above, the low frequency current of the common mode current flowing between the power supply 1 and the control device 3 flows in the electronic device 13. More specifically, in the electronic device 13, the low frequency voltage occurring in the common mode coils is detected, so that the low frequency current corresponding to the low frequency voltage flows therein. It is therefore possible to suppress the low frequency magnetic flux occurring inside the common mode coils 7. Consequently, it is possible to suppress an impedance drop which, if the electronic device 13 were not provided, would be caused by the magnetic saturation occurring in the common mode coils due to the flowing of the low frequency common mode current. As a result, it is possible to suppress the high frequency common mode current with higher reliability.

Further, although a normal current also flows in the common mode coils 7, because there is only a small voltage component of the normal mode current between the terminals of the common mode coils 7, the impacts thereof are negligible. For this reason, without the need to newly provide the cores of the common mode coils 7 with a voltage detection winding wire for the voltage occurring in the common mode coils 7, it is possible to use, also for this purpose, the common mode coils 7 serving to supply the power from the power supply 1 to the control device 3. It is therefore possible to easily detect the voltage occurring in the common mode coils 7.

Further, the noise suppression device 6 includes the first output-side line-to-ground capacitor 10, the second output-side line-to-ground capacitor 11, and the output-side resistor 12. Consequently, it is possible to suppress the resonance.

Further, the electronic device 13 performs the control calculation so that the PI element has the break frequency at the resonance frequency among the common mode coils 7, the first output-side line-to-ground capacitor 10, and the second output-side line-to-ground capacitor 11. Accordingly, it is possible to enhance setting flexibility of the open loop gain. Further, it is also acceptable to enhance the open loop gain in a low frequency range, by adding a PI element having a break frequency at a frequency lower than the break frequency at the resonance frequency.

Further, when the magnetism saturates in the common mode coils 7 only under a specific condition where there is a large load current, it is also possible to configure the electronic device 13 so as to be able to switch between the state of causing and the state of not causing the low frequency current of the current flowing between the power supply 1 and the control device 3 to flow therein. For example, for certain unnecessary time periods, the electronic device 13 does not need to bypass the current, by invalidating the input of the calculation device 16, opening the output of the electronic device 13, or lowering an amplification ratio of the error amplifier 21. In that situation, it is possible to reduce an average heat generation amount of the power amplifier 17. As a result, it is possible to realize the electronic device 13 that is compact and inexpensive.

For example, when the control device 3 supplies the power for driving a car of an elevator, it is also acceptable to determine, based on the load imposed on the car, whether or not to cause the low frequency current of the current flowing between the power supply 1 and the control device 3 to flow. As another example, when the control device 3 supplies the power for driving a car of an elevator, it is also acceptable to determine, based on the speed of the car, whether or not to cause the low frequency current of the current flowing between the power supply 1 and the control device 3 to flow. In these situations, in the elevator system, it is possible to realize the electronic device 13 that is compact and inexpensive.

Next, an example of the calculation device 16 will be explained, with reference to FIG. 6.

Figure 6:
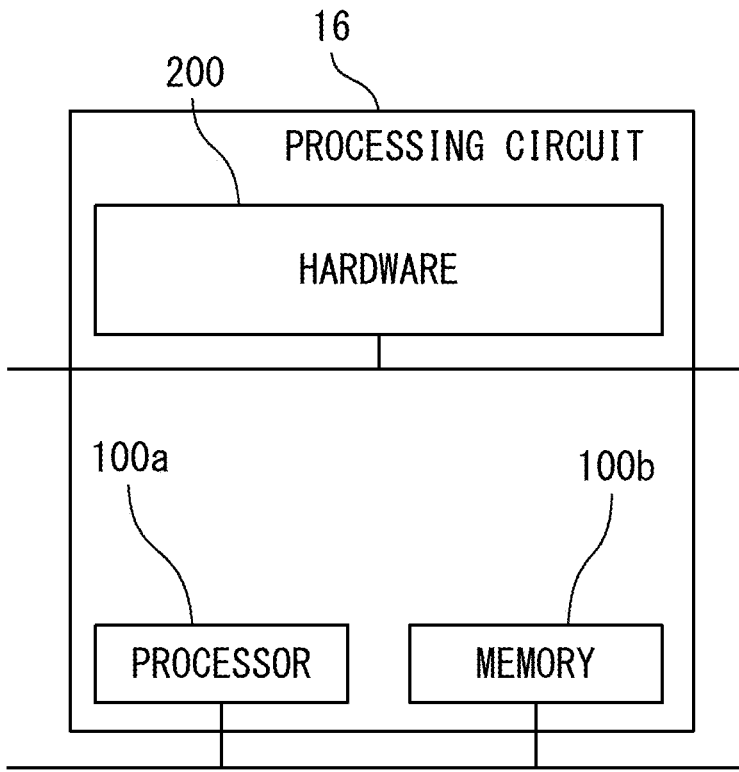
FIG. 6 is a hardware configuration diagram of the calculation device in the noise suppression device according to the first embodiment.

FIG. 6 is a hardware configuration diagram of the calculation device in the noise suppression device according to the first embodiment.

Various functions of the calculation device 16 may be realized by using a processing circuit. For example, the processing circuit includes at least one processor 100*a* and at least one memory 100*b*. For example, the processing circuit includes at least one piece of dedicated hardware 200.

When the processing circuit includes at least one processor 100*a* and at least one memory 100*b*, the various functions of the calculation device 16 are realized by software, firmware, or a combination of software and firmware. One or both of the software and the firmware are written as a program. One or both of the software and the firmware are stored in at least one memory 100*b*. At least one processor 100*a* realizes the functions of the calculation device 16, by reading and executing a program stored in at least one memory 100*b*. At least one processor 100*a* may be referred to as a Central Processing Unit, a processing device, the calculation device 16, a microprocessor, a microcomputer, or a DSP. For example, at least one memory 100*b* may be a non-volatile or volatile semiconductor memory such as a RAM, a ROM, a flash memory, an EPROM, or an EEPROM, or a magnetic disk, a flexible disk, an optical disk, a compact disk, a mini disk, a DVD, or the like.

When the processing circuit includes at least one piece of dedicated hardware 200, the processing circuit is realized by, for example, a single circuit, a composite circuit, a programmed processor, parallel-programmed processors, an ASIC, an FPGA, or a combination of any of these. For example, each of the functions of the calculation device 16 may be realized by a different processing circuit. Alternatively, the functions of the calculation device 16 may collectively be realized by a processing circuit.

As for the functions of the calculation device 16, while some functions are realized by the dedicated hardware 200, the other functions may be realized by software or firmware. For example, functions of the error amplifier 21 may be realized by a processing circuit represented by the dedicated hardware 200, while the functions other than the functions of the error amplifier 21 may be realized as a result of at least one processor 100*a* reading and executing a program stored in at least one memory 100*b*.

In the manner described above, the processing circuit realizes the functions of the calculation device 16, by using the hardware 200, the software, the firmware, or a combination of any of these. The present configuration is a configuration realized by using a digital circuit. Alternatively, the functions of the calculation device 16 shown in FIG. 3 may be realized by using an analog circuit such as an operational amplifier.

Second Embodiment

Figure 7:
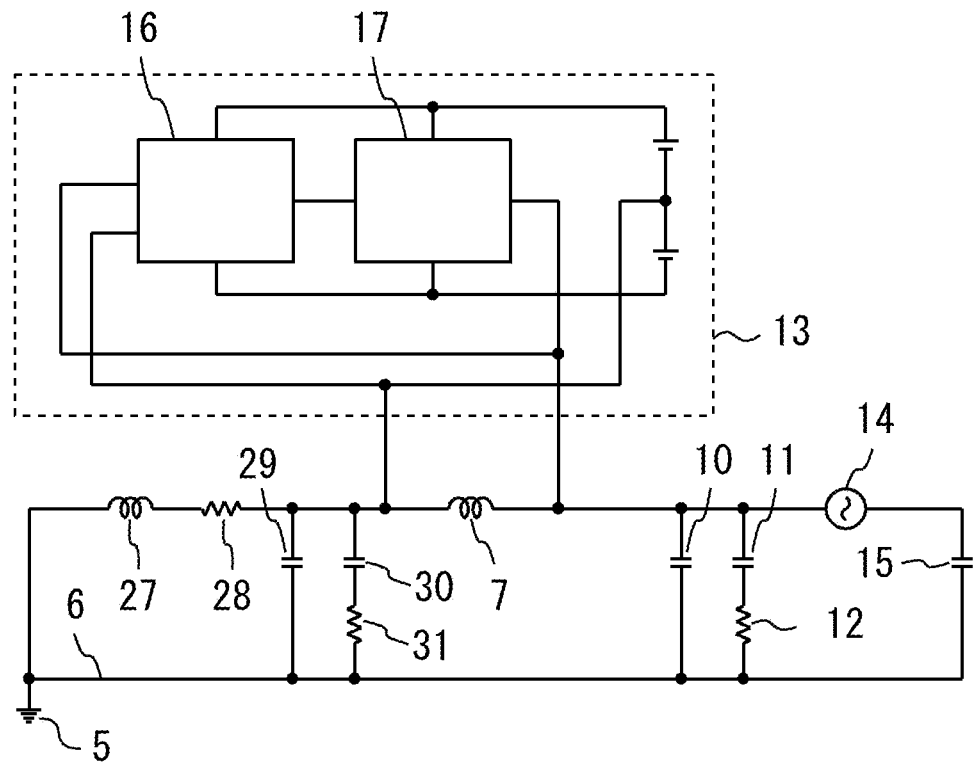
FIG. 7 is an internal configuration diagram of an electronic device in a noise suppression device according to a second embodiment.

FIG. 7 is an internal configuration diagram of an electronic device in a noise suppression device according to a second embodiment. Some of the elements that are the same as, or correspond to, those in the first embodiment will be referred to by using the same reference characters. Explanations of those elements will be omitted.

In FIG. 7, as the wiring on the power supply 1 side becomes longer, the values of a wire inductance 27 and a wire resistance 28 become larger. In that situation, a first input-side line-to-ground capacitor 29, a second input-side line-to-ground capacitor 30, and an input-side resistor 31 are provided.

The first input-side line-to-ground capacitor 29 is connected between a wire provided between the power supply 1 and the common mode coils 7 and the ground wire 4. The second input-side line-to-ground capacitor 30 is connected to a wire provided between the power supply 1 and the common mode coils 7. The input-side resistor 31 is connected between the second input-side line-to-ground capacitor 30 and the ground wire 4.

In the second embodiment described above, the noise suppression device 6 includes the first input-side line-to-ground capacitor 29, the second input-side line-to-ground capacitor 30, and the input-side resistor 31. Accordingly, even when the wiring on the power supply 1 side is long, it is possible to suppress a rise in the impedance on the power supply side. It is therefore possible to maintain stability of the operations of the electronic device 13. Further, with the combination of the first output-side line-to-ground capacitor 10, the second output-side line-to-ground capacitor 11, and the output-side resistor 12, the impedance between the high frequency terminals of the common mode coils 7 is lowered.

For this reason, it is possible to prevent the inter-terminal voltage of the common mode coils 7 from becoming higher due to the high frequency noise. As a result, it is possible to suppress the power supply voltage required by the power amplifier 17 and to suppress heat generation of the power amplifier 17.

INDUSTRIAL APPLICABILITY

As explained above, the noise suppression device of the present disclosure is applicable to the elevator system.

REFERENCE SIGNS LIST

1 Power supply, 2 Motor, 3 Control device, 4 Ground wire, 5 Ground, 6 Noise suppression device, 7 Common mode coil, 8 Input-side interphase capacitor, 9 Output-side interphase capacitor, 10 First output-side line-to-ground capacitor, 11 Second output-side line-to-ground capacitor, 12 Output-side resistor, 13 Electronic device, 14 Common mode voltage source, 15 line-to-ground capacitance, 16 Calculation device, 17 Power amplifier, 18 Error detector, 19 First amplitude amplifier/attenuator, 20 First integrator, 21 Error amplifier, 22 Second amplitude amplifier/attenuator, 23 Third amplitude amplifier/attenuator, 24 Second integrator, 25 Adder, 26 Impedance, 27 Wire inductance, 28 Wire resistance, 29 First input-side line-to-ground capacitor, 30 Second input-side line-to-ground capacitor, 31 Input-side resistor, 100*a* Processor, 100*b* Memory, 200 Hardware

The invention claimed is:

1. A noise suppression device comprising:
   common mode coils connected to each phase of plural phases between a power supply and a control device; and
   an electronic device which is connected in parallel with only one of the common mode coils and in which a low frequency current of a current flowing between the power supply and the control device flows.

2. The noise suppression device according to claim 1, wherein
   the electronic device detects low frequency voltage occurring in the common mode coil, so that a magnetic flux at a low frequency occurring in the common mode coil is suppressed as a result of the flowing of the low frequency current corresponding to the low frequency voltage.

3. The noise suppression device according to claim 1, wherein
   the low frequency voltage occurring in the common mode coil is detected by a common mode coil in which a normal current flows.

4. The noise suppression device according to claim 1, comprising:
   an output-side line-to-ground capacitor connected to a wire provided between the common mode coil and the control device; and
   an output-side resistor connected between the output-side line-to-ground capacitor and a reference potential member.

5. The noise suppression device according to claim 1, comprising:
   an output-side capacitor connected between a wire provided between the common mode coil and the control device and a reference potential member.

6. The noise suppression device according to claim 1, comprising:

an input-side line-to-ground capacitor connected to a wire provided between the power supply and the common mode coil; and an input-side resistor connected between the input-side line-to-ground capacitor and a reference potential member.

7. The noise suppression device according to claim 1, comprising:

an input-side capacitor connected between a wire provided between the power supply and the common mode coil and a reference potential member.

8. The noise suppression device according to claim 1, wherein the electronic device performs a control calculation so that a PI element has a break frequency at a resonance frequency of an element provided between the power supply and the control device.

9. The noise suppression device according to claim 1, wherein the electronic device is configured so as to be able to switch between a state of causing and a state of not causing the low frequency current of the current flowing between the power supply and the control device to flow in the electronic device.

10. The noise suppression device according to claim 9, wherein when the control device supplies electric power for driving a car of an elevator, the electronic device determines whether or not to cause the low frequency current of the current flowing between the power supply and the control device to flow in the electronic device, based on a load imposed on the car.

11. The noise suppression device according to claim 9, wherein when the control device supplies electric power for driving a car of an elevator, the electronic device determines whether or not to cause the low frequency current of the current flowing between the power supply and the control device to flow in the electronic device, based on a speed of the car.

* * * * *